(12) United States Patent
Bai et al.

(10) Patent No.: US 12,517,739 B2
(45) Date of Patent: Jan. 6, 2026

(54) INTERFACE DISPLAY METHOD AND APPARATUS, DEVICE, COMPUTER-READABLE STORAGE MEDIUM, AND PRODUCT

(71) Applicant: Beijing Zitiao Network Technology Co., Ltd., Beijing (CN)

(72) Inventors: Xiaoshuang Bai, Beijing (CN); Zhehao You, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/948,358

(22) Filed: Nov. 14, 2024

(65) Prior Publication Data

US 2025/0077247 A1 Mar. 6, 2025

Related U.S. Application Data

(63) Continuation of application No. PCT/CN2023/098165, filed on Jun. 2, 2023.

(30) Foreign Application Priority Data

Jun. 7, 2022 (CN) .......................... 202210642014.8

(51) Int. Cl.
*G06F 9/451* (2018.01)
*G06F 3/04847* (2022.01)

(52) U.S. Cl.
CPC .......... *G06F 9/451* (2018.02); *G06F 3/04847* (2013.01)

(58) Field of Classification Search
CPC ..................... G06F 9/451; G06F 3/04847
See application file for complete search history.

(56) References Cited

U.S. PATENT DOCUMENTS

2015/0077326 A1 3/2015 Kramer et al.
2015/0153929 A1* 6/2015 Bernstein .............. G06F 3/0488
715/781

(Continued)

FOREIGN PATENT DOCUMENTS

CN 104484101 A 4/2015
CN 105511754 A 4/2016
(Continued)

OTHER PUBLICATIONS

"Android10 SystemUI drop-down bar background Gaussian blur"; https://blog.csdn.net/zengli8540/article/details/116851134?utm_medium=distribute.pc_aggpage_search_result.none-task-blog-2~aggregatepage~first_rank_ecpm_v1~rank_v31_ecpm-10-116851134-null-null.pc_agg_new_rank&utm_term=android+systemui+%E4%B8%88%E6%8B%89&spm=1000.2123.3001.4430; CSDN; May 2021; accessed Dec. 16, 2024; 26 pages.

(Continued)

*Primary Examiner* — Andrey Belousov
(74) *Attorney, Agent, or Firm* — BakerHostetler

(57) ABSTRACT

The embodiments of the present disclosure provide an interface display method, an interface display apparatus, a device, a computer-readable storage medium, and a product. The method includes: displaying a preset first information display interface; and in response to a first preset triggering operation on the first information display interface, redirecting to a preset function display interface corresponding to a target function, and displaying at least one function component corresponding to the target function in the function display interface. The first preset triggering operation is a triggering operation with a trigger track, and a length of the trigger track is greater than a preset length threshold.

20 Claims, 6 Drawing Sheets

(56) References Cited

U.S. PATENT DOCUMENTS

2016/0125477 A1 5/2016 Greenberg et al.
2024/0385906 A1* 11/2024 Bian .................. G06F 9/541

FOREIGN PATENT DOCUMENTS

| CN | 107977126 | A | * | 5/2018 | ........... G06F 3/0481 |
|----|-----------|---|---|--------|------------------------|
| CN | 304980887 | S | | 1/2019 | |
| CN | 109857296 | A | | 6/2019 | |
| CN | 109976645 | A | | 7/2019 | |
| CN | 110083282 | A | | 8/2019 | |
| CN | 112153288 | A | | 12/2020 | |
| CN | 112513782 | A | | 3/2021 | |
| CN | 113253885 | A | | 8/2021 | |
| CN | 113721810 | A | | 11/2021 | |
| CN | 114491349 | A | | 5/2022 | |
| CN | 115061602 | A | | 9/2022 | |
| CN | 115061602 | B | | 10/2024 | |
| EP | 3617863 | A1 | | 3/2020 | |
| WO | WO 2022/068698 | A1 | | 4/2022 | |

OTHER PUBLICATIONS

"What does Tik Tok's Close Friend Moments mean? How to set up Close Friend Moments"; https://www.upan.cc/shoujirua-njian/remenzixun/15515.html; UPAN; Apr. 2022; accessed May 27, 2024; 4 pages.
China Patent Application No. 202210642014.8; Office Action; dated Oct. 27, 2023; 11 pages.
China Patent Application No. 202210642014.8; Second Office Action; dated May 16, 2024; 11 pages.
China Patent Application No. 202210642014.8; Notification of Grant; Aug. 22, 2024; 14 pages.
International Patent Application No. PCT/CN2023/098165; Int'l Written Opinion and Search Report; dated Aug. 28, 2023; 7 pages.
European Patent Application No. 23819040.9; Extended Search Report; dated Jul. 3, 2025; 10 pages.
Japan Patent Application No. 2024-567514; Notice of Refusal; dated May 13, 2025; 6 pages.

* cited by examiner

INTERFACE DISPLAY METHOD AND APPARATUS, DEVICE, COMPUTER-READABLE STORAGE MEDIUM, AND PRODUCT

This application is a continuation of International Patent Application No. PCT/CN2023/098165, filed on Jun. 2, 2023, which claims the priority to and benefits of the Chinese Patent Application No. 202210642014.8, which was filed on Jun. 7, 2022. All the aforementioned patent applications are hereby incorporated by reference in their entireties.

TECHNICAL FIELD

Embodiments of the present disclosure relate to the technical field of interface interaction, in particular to an interface display method, an interface display apparatus, a device, a computer-readable storage medium, a computer program, and a computer program product.

BACKGROUND

With the improvement of hardware performance of terminal devices and the continuous advancement of artificial intelligence technology, there are more and more functions in applications (APPs) running on the terminal devices.

SUMMARY

The embodiments of the present disclosure provide an interface display method, an interface display apparatus, a device, a computer-readable storage medium, a computer program, and a computer program product.

In a first aspect, the embodiments of the present disclosure provide an interface display method, comprising:
  displaying a preset first information display interface, and
  in response to a first preset triggering operation on the first information display interface, redirecting to a preset function display interface corresponding to a target function, and displaying at least part of function components corresponding to the target function in the function display interface; and
  the first preset triggering operation is a triggering operation with a trigger track, and a length of the trigger track is greater than a preset length threshold.

In a second aspect, the embodiments of the present disclosure provide an interface display apparatus, comprising:
  a display module, configured to display a preset first information display interface; and
  a processing module, configured to, in response to a first preset triggering operation on the first information display interface, redirect to a preset function display interface corresponding to a target function, and display at least part of function components corresponding to the target function in the function display interface; and
  the first preset triggering operation is a triggering operation with a trigger track, and a length of the trigger track is greater than a preset length threshold.

In a third aspect, the embodiments of the present disclosure provide an electronic device, comprising: at least one processor and a memory;
  the memory stores computer execution instructions; and
  the at least one processor executes the computer execution instructions stored in the memory, so that the at least one processor is caused to execute the interface display method according to the first aspect and various possible designs of the first aspect described above.

In a fourth aspect, the embodiments of the present disclosure provide a computer-readable storage medium, the computer-readable storage medium stores computer execution instructions, and when a processor executes the computer execution instructions, the interface display method according to the first aspect and various possible designs of the first aspect described above is implemented.

In a fifth aspect, the embodiments of the present disclosure provide a computer program product, comprising: computer execution instructions; and when a processor executes the computer execution instructions, the interface display method according to the first aspect and various possible designs of the first aspect described above is implemented.

In a sixth aspect, the embodiments of the present disclosure provide a computer program, comprising: computer execution instructions; and when a processor executes the computer execution instructions, the interface display method according to the first aspect and various possible designs of the first aspect described above is implemented.

BRIEF DESCRIPTION OF DRAWINGS

In order to more clearly illustrate the technical solutions of the embodiments of the present disclosure or technical solutions in the related art, the drawings that need to be used in description of the embodiments or related art will be briefly introduced in the following. It is obvious that the drawings described below are only related to some embodiments of the present disclosure, and for those skilled in the art, other drawings can be obtained based on these accompanying drawings without inventive efforts.

DETAILED DESCRIPTION

In order to clarify the objectives, technical solutions, and advantages of the embodiments of the present disclosure, the technical solutions in the embodiments of the present disclosure will be clearly and completely described with reference to the accompanying drawings in the embodiments of the present disclosure. Obviously, the described embodiments are only a part of the embodiments of the present disclosure, not all of the embodiments. Based on the embodiments of the present disclosure, all other embodiments obtained by those skilled in the art without inventive efforts are within the protection scope of the present disclosure.

For the above-mentioned technical problem that the interaction process of the existing interface display method is relatively cumbersome, the present disclosure provides an interface display method, an interface display apparatus, a device, a computer-readable storage medium, a computer program, and a computer program product.

It should be noted that the interface display method, the interface display apparatus, the device, the computer-readable storage medium, the computer program, and the computer program product provided by the present disclosure can be applied to various scenes of function interface display.

An entry of an existing target function is generally set in a function bar at the top of a message interface, and a user needs to select and trigger the function according to actual requirements. However, when more content is displayed in the function bar, a triggering operation for the entry of the target function is cumbersome, resulting in low calling efficiency of the target function.

In the present disclosure, after an information display interface is displayed, if a preset triggering operation triggered by a user is acquired, a function display interface of the target function can be redirected to, the interface interaction operation is relatively simple and convenient, and the calling efficiency of the target function is improved. In addition, the interface interaction process is simplified, and the user experience is improved.

Figure 1:
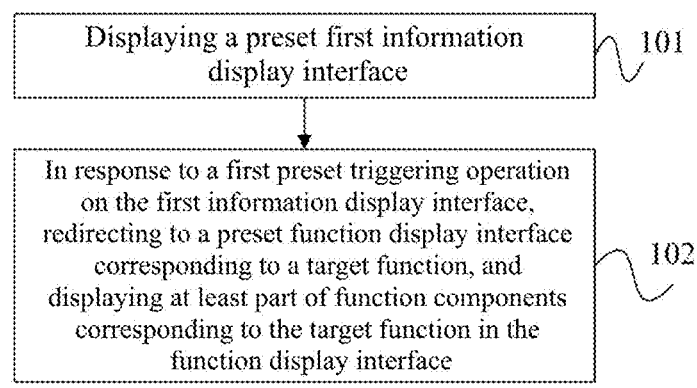
FIG. 1 is a flowchart of an interface display method provided by an embodiment of the present disclosure.

FIG. 1 is a flowchart of an interface display method provided by an embodiment of the present disclosure. As illustrated in FIG. 1, the method includes:

Step 101: displaying a preset first information display interface.

In this embodiment, an execution subject is an interface display apparatus. The interface display apparatus can be coupled to a terminal device, so that interface display processing can be carried out according to the triggering operation of the user on the terminal device. Optionally, the interface display apparatus can also be coupled to a server. The server can be in communication connection with the terminal device, so that the triggering operation of the user on the terminal device can be acquired, and thus the terminal device can be controlled to carry out interface display processing according to the triggering operation.

In this implementation, the preset first information display interface can be displayed. The preset first information display interface includes, but is not limited to, any one of display interfaces such as a message display interface, a personal information display interface, or the like in application software, which is not limited in the present disclosure.

Optionally, when the first information display interface is the message display interface in the application software, the first information display interface may include interaction information of at least one current user and an associated user. The associated user may be a friend having a following relationship with the current user, or the associated user may be a system account or the like.

Step 102: in response to a first preset triggering operation on the first information display interface, redirecting to a preset function display interface corresponding to a target function, and displaying at least part of function components corresponding to the target function in the function display interface, where the first preset triggering operation is a triggering operation with a trigger track, and a length of the trigger track is greater than a preset length threshold.

In this implementation, in order to achieve the triggering of the function display interface corresponding to the target function, the first preset triggering operation can be set in advance. The first preset triggering operation is the triggering operation having the trigger track, and the length of the trigger track is greater than the preset length threshold. Further, the trigger track of the first preset triggering operation meets preset track requirements, such as the shape, direction, moving speed, or the like of the track.

The first preset triggering operation includes, but is not limited to, triggering operations such as sliding operations in all directions, operations of drawing a preset pattern on the display interface, etc. The user can select the triggering operation complying with personalized requirements as the first preset triggering operation according to actual requirements. Alternatively, the first preset triggering operation may be a triggering operation defaulted by the application, which is not limited in the present disclosure.

Further, if the first preset triggering operation of the user on the first information display interface is acquired, the preset function display interface corresponding to the target function can be redirected to in response to the first preset triggering operation. Optionally, the target function is a creation content acquisition function and/or a creation content release function. Alternatively, the target function may also be any one of an e-commerce function, a social function, and the like. The user can set a target function that can be called through the first preset triggering operation according to the actual requirements, or the target function can be a target function defaulted by the application, which is not limited in the present disclosure.

Further, in order to facilitate the use of the target function by the user, after the function display interface corresponding to the target function is redirected to, at least part of function components corresponding to the target function can be displayed in the function display interface.

For example, with the target function as the creation content acquisition function, after the function display interface corresponding to the target function is redirected to, the creation content acquisition component corresponding to the creation content acquisition function can be displayed in the function display interface.

Figure 2:
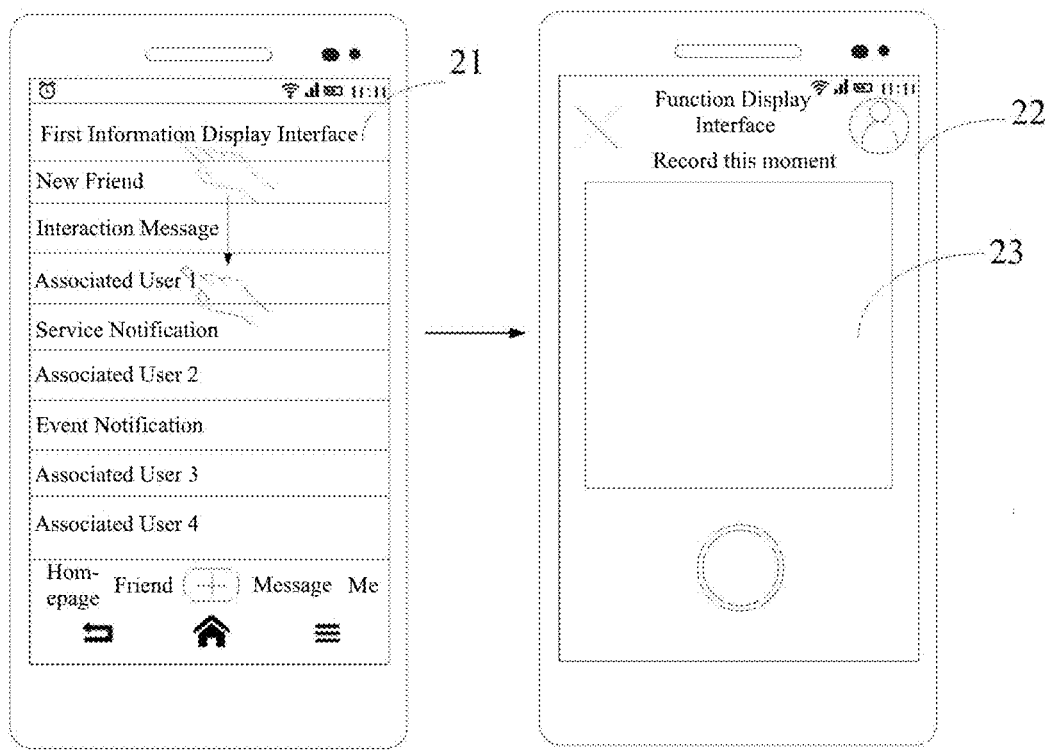
FIG. 2 is an interface interaction schematic diagram provided by an embodiment of the present disclosure.

FIG. 2 is an interface interaction schematic diagram provided by an embodiment of the present disclosure. As shown in FIG. 2, the display interface can be controlled to display a preset first information display interface 21, and the first information display interface 21 can be specifically a message interface. In response to the first preset triggering operation of the user on the first information display interface 21, a preset function display interface 22 corresponding to the target function is redirected to, and at least part of function components 23 corresponding to the target function is displayed in the function display interface 22. The first preset triggering operation can be specifically a pull-down operation. The target function can be the creation content acquisition function. Correspondingly, the at least part of function components 23 can be the creation content acquisition component.

According to the interface display method provided by this embodiment, after the preset first information display interface is displayed, the preset function display interface corresponding to the target function is redirected to in response to the first preset triggering operation of the user on the first information display interface, and the at least part of function components corresponding to the target function is displayed in the function display interface. Thus, the function display interface corresponding to the target function can be redirected to through the convenient interface interaction operation in the first information display interface, so that the user can quickly use the target function, and the interface interaction experience is improved.

Further, on the basis of any embodiment described above, after Step 102, the method further includes:

in response to the first preset triggering operation triggered by a user in the function display interface, returning to the first information display interface, and/or in response to a second preset triggering operation triggered by the user in the function display interface, redirecting to a second information display interface.

In this embodiment, after the function display interface is redirected to, in order to meet diversified function use requirements of the user, the function display interface can be redirected to other interfaces.

Specifically, it can be returned to the first information display interface in response to the first preset triggering operation triggered by the user in the function display interface. For example, in actual application, the first preset triggering operation may specifically be a sliding-down operation. The user can redirect to the function display interface through the sliding-down operation in the first information display interface. In the function display interface, the user can return to the first information display interface through the sliding-down operation. Thus, rapid switching operation on the first information display interface and the function display interface can be achieved. The interface interaction process is effectively reduced, and the user experience is improved.

Figure 3:
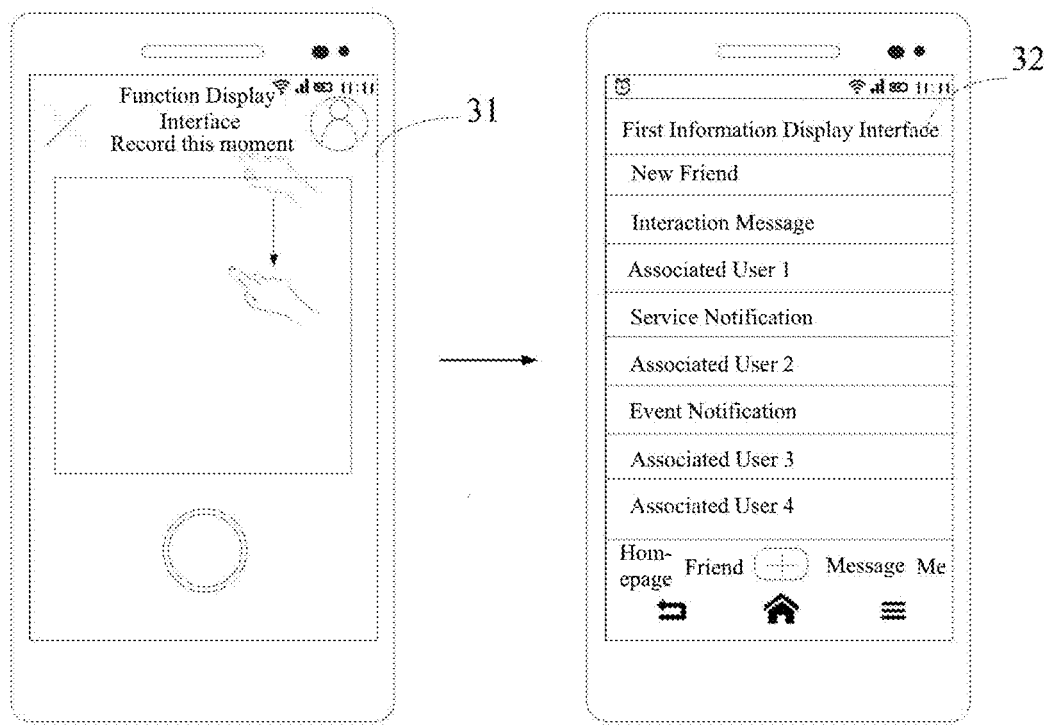
FIG. 3 is another interface interaction schematic diagram provided by an embodiment of the present disclosure.

FIG. 3 is another interface interaction schematic diagram provided by an embodiment of the present disclosure. As shown in FIG. 3, when displaying the function display interface 31, the first information display interface 32 can be returned and displayed in response to the first preset triggering operation triggered by the user. The first preset triggering operation may be specifically a pull-down operation. The first information display interface 32 may be a message interface.

Optionally, the target function may further include a second information display interface, and the user can redirect to the second information display interface through the second preset triggering operation in the function display interface.

Here the second preset triggering operation and the first preset triggering operation are opposite gesture operations. For example, if the first preset triggering operation is the sliding-down operation, correspondingly, the second preset triggering operation is a sliding-up operation. If the first preset triggering operation is a sliding-left operation, correspondingly, the second preset triggering operation is a sliding-right operation.

For example, still by practical application, the first preset triggering operation may specifically be a sliding-down operation. The user can redirect to the function display interface through a sliding-down operation in the first information display interface. In the function display interface, the user can redirect to the second information display interface through a sliding-up operation opposite to the sliding-down operation.

Optionally, the second information display interface is a content display interface associated with the target function.

Optionally, when the target function is a creation content release function, the second information display interface may specifically be a creation content display interface.

Figure 4:
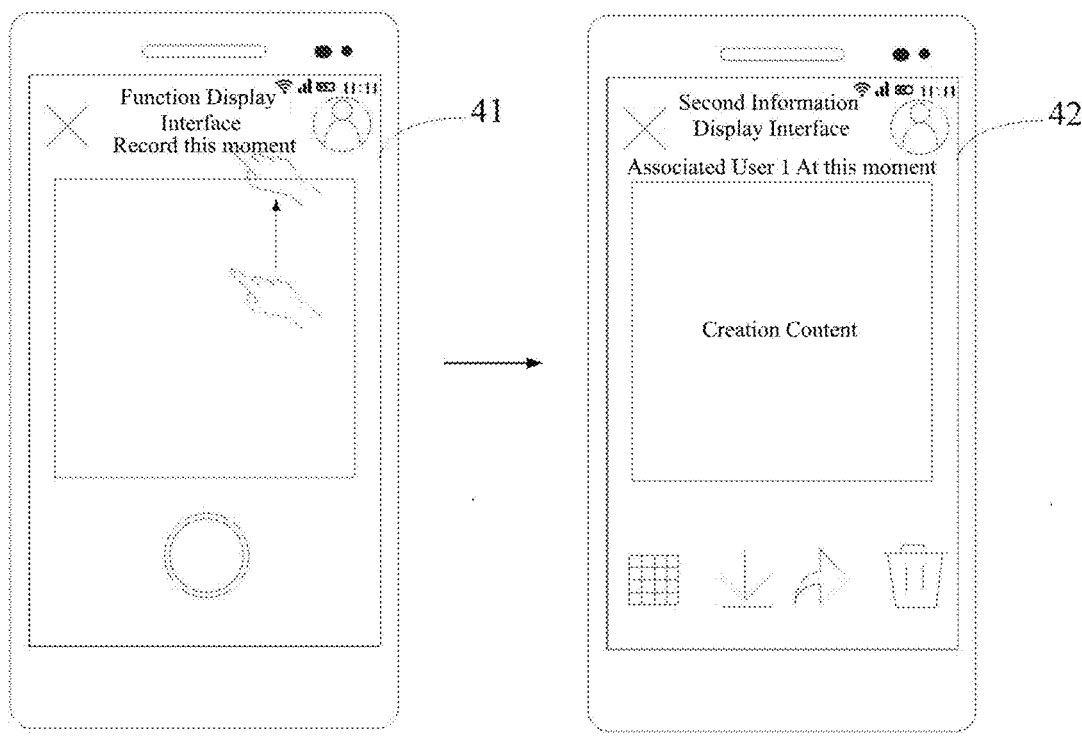
FIG. 4 is still another interface interaction schematic diagram provided by an embodiment of the present disclosure.

FIG. 4 is still another interface interaction schematic diagram provided by an embodiment of the present disclosure. As shown in FIG. 4, when displaying a function display interface 41, a second information display interface 42 can be redirected to in response to the second preset triggering operation triggered by the user. The second preset triggering operation may be a sliding-up operation, and the second information display interface 42 may be a creation content display interface.

According to the interface display method provided by this embodiment, the opposite first preset triggering operation and second preset triggering operation are set, so that the redirecting operation can be quickly achieved among the first information display interface, the function display interface, and the second information display interface. The calling process corresponding to the target function is simplified, the interface interaction mode is relatively convenient, and the user experience is improved.

Further, on the basis of any embodiment described above, the method further includes:

in response to the first preset triggering operation triggered by the user in the second information display interface, redirecting to the function display interface, and/or in response to a third preset triggering operation triggered by the user in the second information display interface, redirecting to the first information display interface.

In this embodiment, when displaying the second information display interface, the user can also achieve interface switching operations through the triggering operation in the second information display interface.

Specifically, it can be redirected to the function display interface in response to the first preset triggering operation triggered by the user in the second information display interface. As described above, the first preset triggering operation may be specifically the sliding-down operation. It can be redirected to the first information display interface in response to the sliding-down operation triggered by the user in the second information display interface. Optionally, it can also be redirected to the function display interface in response to the sliding-down operation triggered by the user in the second information display interface. The user can adjust the interface to be redirected according to actual needs, which is not limited in the present disclosure.

Optionally, it can also be redirected to the first information display interface in response to the third preset triggering operation triggered by the user in the second information display interface. The third preset triggering operation may be specifically a sliding-right operation, or any triggering operation different from the first preset triggering operation and the second preset triggering operation, which is not limited in the present disclosure.

According to the interface display method provided by this embodiment, the redirecting operation can be quickly achieved among different interfaces in response to the first preset triggering operation and/or the third preset triggering operation triggered by the user in the second information display interface, so that the calling efficiency of the target function is improved, the redirecting efficiency of the target function and other functions in the application software is improved, and the use experience of the user is optimized.

Figure 5:
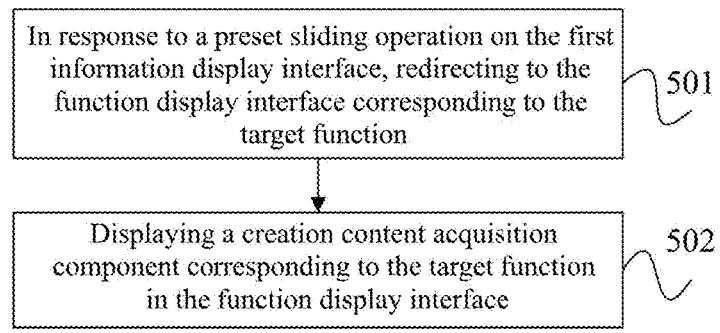
FIG. 5 is a flowchart of an interface display method provided by another embodiment of the present disclosure.

FIG. 5 is a flowchart of an interface display method provided by another embodiment of the present disclosure. On the basis of any embodiment described above, as shown in FIG. 5, Step 102 includes:

Step 501: in response to a preset sliding operation on the first information display interface, redirecting to the function display interface corresponding to the target function.

Step 502: displaying a creation content acquisition component corresponding to the target function in the function display interface, the creation content acquisition component including a creation content capturing component and/or a creation content upload component.

In this embodiment, the first preset triggering operation may be specifically a preset sliding operation, the preset sliding operation may be a sliding operation in any direction, and the user can adjust the sliding direction according to actual needs. Optionally, the target function may be specifically the creation content acquisition and/or creation content release function, and correspondingly, the function component may be specifically the creation content acquisition component.

Optionally, the information display interface can be displayed in the display interface, and the information display interface includes at least one of: the first information display interface, the second information display interface, and any other information display interface. In the information display interfaces described above, the redirecting operation on the function display interface corresponding to the target function can be achieved through the preset sliding operation.

It can be redirected to the function display interface corresponding to the target function in response to the preset sliding operation of the user on the first information display interface. The creation content acquisition component corresponding to the target function is displayed in the function display interface, and the creation content acquisition component includes the creation content capturing component and/or the creation content upload component. The user can implement a capturing operation on the creation content through the triggering operation on the creation content capturing component. Alternatively, the user can select the pre-stored creation content for uploading through the creation content upload component.

Through the preset sliding operation, the redirecting operation on the function display interface is carried out, and the creation content acquisition component is displayed, so that the user can conveniently acquire the creation content, and the operation process is relatively simple.

Further, on the basis of any embodiment described above, Step 501 includes:

in response to the preset sliding operation on the first information display interface, displaying preset first prompt information in a preset region around the first information display interface when the first information display interface is slid to a preset first position interval, the first prompt information being used for prompting interface redirecting mode information corresponding to the sliding operation; and displaying preset second prompt information in the preset region around the first information display interface when the first information display interface is slid to a preset second position interval, the second prompt information being used for prompting a display condition of the function display interface.

The second position interval arrives after the first position interval along a preset sliding direction.

In this embodiment, when the user triggers the preset sliding operation in the first information display interface, the prompt information can be displayed in the preset region around the first information display interface in order to enable the user to more visually determine the interface redirecting condition corresponding to the preset sliding operation.

Optionally, the first position interval and the second position interval can be set in advance. When the first information display interface is slid to different position intervals, different prompt information can be displayed. The second position interval arrives after the first position interval along the preset sliding direction. For example, when the sliding operation is the sliding-down operation, the second position interval can be located on the lower side of the first position interval.

Further, in response to the preset sliding operation of the user on the first information display interface, when it is detected that the first information display interface is slid to the preset first position interval, the preset first prompt information can be displayed in the preset region around the first information display interface. The first prompt information is used for prompting interface redirecting mode information corresponding to the sliding operation. For example, the first prompt information may be specifically: pulling down to enter the function display interface. The first prompt information may be specifically displayed at the top of the first information display interface.

In response to the preset sliding operation of the user on the first information display interface, when it is detected that the first information display interface is slid to the preset second position interval, the preset second prompt information is displayed in the preset region around the first information display interface. The second prompt information is used for prompting a display condition of the function display interface, and the second prompt information may be specifically: releasing to enter the function display interface. The second prompt information may be specifically displayed at the top of the first information display interface.

Figure 6:
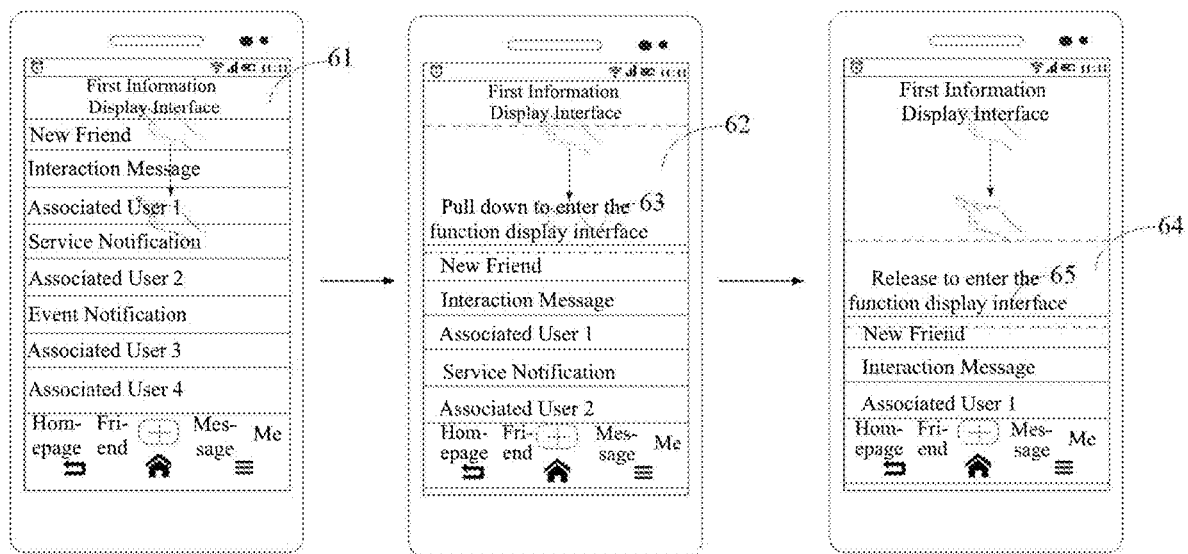
FIG. 6 is further still another interface interaction schematic diagram provided by an embodiment of the present disclosure.

FIG. 6 is further still another interface interaction schematic diagram provided by an embodiment of the present disclosure. As shown in FIG. 6, the preset sliding operation may be specifically the sliding-down operation. In response to the preset sliding operation of the user on the first information display interface 61, when the first information display interface 61 is slid to the preset first position interval 62, preset first prompt information 63 is displayed in the preset region around the first information display interface 61. The first prompt information 63 may be specifically: pulling down to enter the function display interface. When the first information display interface 61 is slid to the preset second position interval 64, preset second prompt information 65 is displayed in the preset region around the first information display interface 61. The second prompt information 65 may be specifically: releasing to enter the function display interface.

Optionally, if the user does not redirect to the function display interface through the preset triggering operation, or the user does not use the target function, in order to enable the user to know about the target function, preset third prompt information can be displayed in the first information display interface. The third prompt information is used for prompting the user to redirect to the function display interface through the preset triggering operation. For example, the third prompt information may be specifically: sliding down to enter the function display interface.

By setting different position intervals, when the function display interface is slid to different position intervals, different prompt information will be displayed, so that the user can know about the interface redirecting information of the sliding operation more visually.

Further, on the basis of any embodiment described above, the creation content upload component includes a creation content selection control, and after Step 501, the method further includes:
  displaying the creation content selection control in a preset display region in the function display interface, and
  in response to a triggering operation of the user on the creation content selection control, redirecting to a creation content list, the creation content list including at least one type of creation content.

In this embodiment, the creation content upload component includes the creation content selection control, and the user can implement a selection operation on multiple pre-stored creation contents through the triggering operation on the creation content selection control.

Specifically, after redirecting to the function display interface, the creation content selection control can be displayed in the preset display region in the function display interface. In response to the triggering operation of the user on the creation content selection control, redirecting to the creation content list can be performed, and the creation content list includes at least one type of creation content. For example, the creation content includes, but is not limited to, an image content, an audio content, a text content, a video content, or the like.

Figure 7:
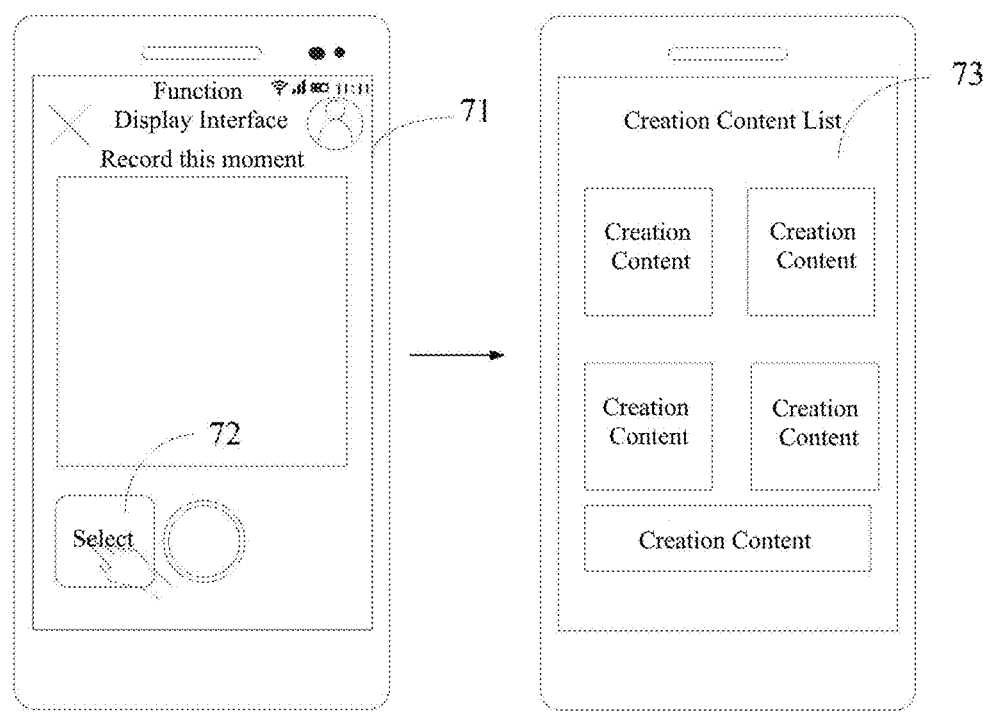
FIG. 7 is further still another interface interaction schematic diagram provided by an embodiment of the present disclosure.

FIG. 7 is further still another interface interaction schematic diagram provided by an embodiment of the present disclosure. As shown in FIG. 7, the creation content selection control 72 is displayed in the function display interface 71. In response to the triggering operation of the user on the creation content selection control 72, the creation content list 73 can be redirected to, and the creation content list 73 includes at least one type of creation content.

Further, on the basis of any embodiment described above, after, in response to the triggering operation of the user on the creation content selection control, redirecting to the creation content list, the method further includes:
  in response to a selection operation of the user on a creation content in the creation content list, determining a target creation content selected by the user, and
  in response to a release request triggered by the user, releasing the target creation content.

In this embodiment, after the creation content list is displayed, the user can select the creation content in the creation content list according to actual needs. Correspondingly, the target creation content selected by the user can be determined in response to the selection operation of the user. Optionally, the creation content list may further include a release icon, and after the target creation content selected by the user is determined, the target creation content can be released in response to the release request triggered by the user triggering the release icon.

After the user transmits the target creation content, other users having a preset association relationship with the user can view the target creation content.

Further, on the basis of any embodiment described above, after displaying the creation content acquisition component corresponding to the target function in the function display interface, the method further includes:
  displaying, in the creation content capturing component with a preset display effect, a content collected by the creation content acquisition component when the creation content acquisition component is turned off last time, and/or displaying a preset creation content in the creation content acquisition component with a preset display effect.

In this embodiment, after the user redirects to the function display interface through the first preset triggering operation, the function display interface can include the creation content capturing component. The content collected by the creation content acquisition component when the creation content acquisition component is turned off last time can be displayed in the creation content capturing component with the preset display effect. For example, the image content collected when the user closes the creation content acquisition component last time can be displayed with a frosted glass display effect.

Optionally, the preset creation content can be displayed in the creation content acquisition component with the preset display effect. For example, a creation content can be set in advance, and the preset creation content is displayed with the frosted glass display effect.

Further, on the basis of any embodiment described above, the creation content capturing component includes a preset creation content capturing control, and after displaying the creation content acquisition component corresponding to the target function in the function display interface, the method further includes:
  in response to a triggering operation of the user on the preset creation content capturing control in the function display interface, performing a creation content acquisition operation to obtain a target creation content, and
  in response to a release request triggered by the user, releasing the target creation content.

In this embodiment, the creation content capturing component may be specifically a preset creation content capturing control. The user can implement the capturing operation on the creation content through the triggering operation on the preset creation content capturing control. Specifically, in response to the triggering operation of the user on the preset creation content capturing control in the function display interface, the creation content acquisition operation can be carried out to obtain the target creation content. Optionally, the creation content list may also include the release icon, and after the target creation content selected by the user is determined, the target creation content can be released in response to the release request triggered by the user triggering the release icon.

After the user transmits the target creation content, other users having the preset association relationship with the user can view the target creation content.

Figure 8:
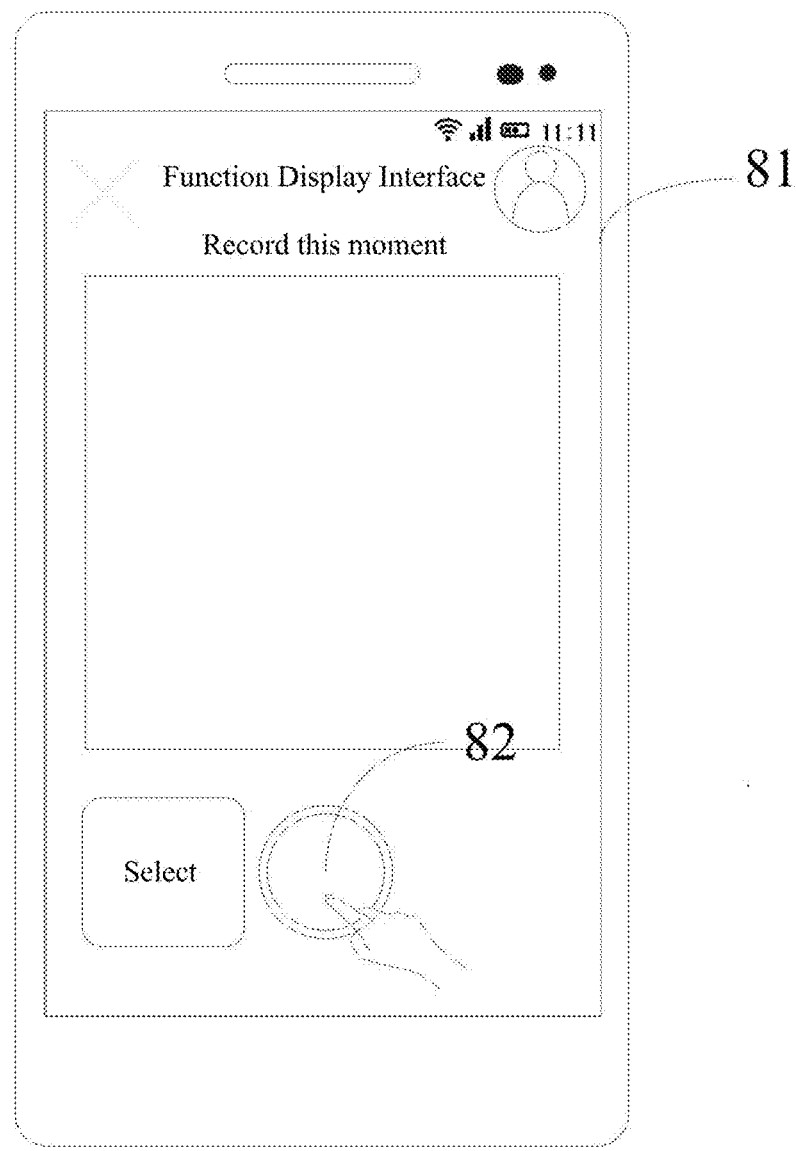
FIG. 8 is a display interface schematic diagram provided by an embodiment of the present disclosure.

FIG. 8 is a display interface schematic diagram provided by an embodiment of the present disclosure. As shown in FIG. 8, a preset creation content capturing control 82 is further displayed in the function display interface 81, and the user can implement the capturing operation by triggering the preset creation content capturing control 82. Further, the function display interface can further include an editing icon and/or a release icon, which are/is used for editing and releasing the creation content.

According to the interface display method provided by this embodiment, by setting different creation content acquisition components, the user can use different acquisition components to implement the acquisition operation on the creation content according to actual needs, so that the use of the target function can better meet the personalized requirements of the user, and the user experience is improved.

Further, on the basis of any embodiment described above, the method further includes:

in response to a triggering operation of a user on a preset function icon in any third information display interface, redirecting to the function display interface, and displaying at least part of function components corresponding to the target function in the function display interface, the third information display interface being an other interface in an application to which the function display interface belongs or an interface outside the application.

In this embodiment, the user can select to add the function icon corresponding to the target function to the third information display interface according to actual needs, and the third information display interface is another interface in the application to which the function display interface belongs or an interface outside the application. For example, the third information display interface can be a desktop of the terminal device, or the third information display interface can be other information display interfaces in the application, which is not limited in the present disclosure.

Further, after the third information display interface displays the preset function icon, the function display interface can be redirected to in response to the triggering operation of the user on the preset function icon, and at least part of function components corresponding to the target function can be displayed in the function display interface.

Further, on the basis of any embodiment described above, after displaying at least part of function components corresponding to the target function in the function display interface, the method further includes:

in response to a preset triggering operation of the user on the function display interface, returning to the third information display interface where the function icon is located.

In this embodiment, if the user redirects to the function display interface by triggering the function icon in the third information display interface, the third information display interface where the function icon is located is returned in response to the preset triggering operation of the user on the function display interface.

The preset triggering operation may be the preset sliding operation, the operation of drawing a preset pattern on the display interface, the operation of triggering a preset return icon, or the like, which is not limited in the present disclosure.

Further, on the basis of any embodiment described above, the first information display interface includes a preset display icon, and after displaying the preset first information display interface, the method further includes:

in response to a triggering operation of a user on the display icon, redirecting to the function display interface, and displaying at least part of function components corresponding to the target function in the function display interface.

In this embodiment, the first information display interface includes the preset display icon. After the first information display interface displays the display icon, the function display interface can be redirected to in response to the triggering operation of the user on the display icon, and at least part of function components corresponding to the target function can be displayed in the function display interface. The convenience of calling the target function is further improved.

According to the interface display method provided by this embodiment, the function icon of the target function is displayed on the third information display interface, so that the calling operation on the target function from the third information display interface can be achieved. In addition, it can be returned to the third information display interface where the function icon is located in response to the preset triggering operation of the user on the function display interface, so that the use of the target function by the user can better satisfy the actual needs of the user.

Figure 9:
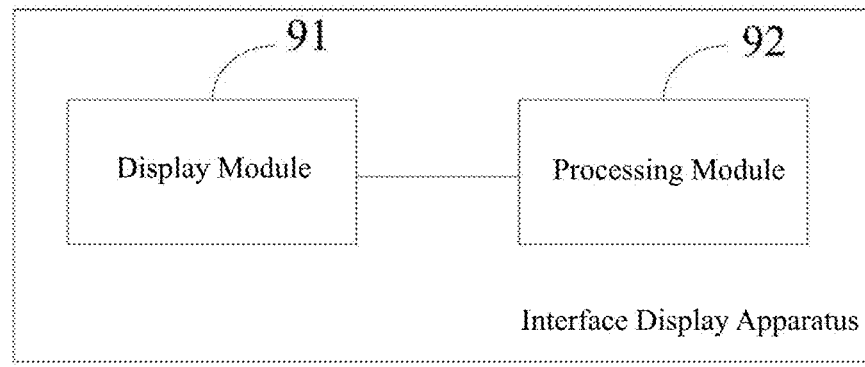
FIG. 9 is a schematic structural diagram of an interface display apparatus provided by an embodiment of the present disclosure.

FIG. 9 is a schematic structural diagram of an interface display apparatus provided by an embodiment of the present disclosure. As shown in FIG. 9, the apparatus includes a display module 91 and a processing module 92. The display module 91 is configured to display a preset first information display interface. The processing module 92 is configured to, in response to a first preset triggering operation on the first information display interface, redirect to a preset function display interface corresponding to a target function, and display at least part of function components corresponding to the target function in the function display interface. The first preset triggering operation is a triggering operation with a trigger track, and a length of the trigger track is greater than a preset length threshold.

Further, on the basis of any embodiment described above, the apparatus further includes: a return module, configured to, in response to the first preset triggering operation triggered by a user in the function display interface, return to the first information display interface; and/or a redirecting module, configured to, in response to a second preset triggering operation triggered by the user in the function display interface, redirect to a second information display interface.

Further, on the basis of any embodiment described above, the second preset triggering operation and the first preset triggering operation are opposite gesture operations.

Further, on the basis of any embodiment described above, the apparatus further includes: a redirecting module, configured to, in response to the first preset triggering operation triggered by the user in the second information display interface, redirect to the function display interface; and/or a redirecting module, configured to, in response to a third preset triggering operation triggered by the user in the second information display interface, redirect to the first information display interface.

Further, on the basis of any embodiment described above, the second information display interface is a content display interface associated with the target function.

Further, on the basis of any embodiment described above, the target function is a creation content acquisition function and/or a creation content release function.

Further, on the basis of any embodiment described above, the processing module is configured to, in response to a preset sliding operation on the first information display interface, redirect to the function display interface corresponding to the target function, a creation content acquisition component corresponding to the target function is displayed in the function display interface, and the creation content acquisition component comprises a creation content capturing component and/or a creation content upload component.

Further, on the basis of any embodiment described above, the processing module is configured to: in response to the preset sliding operation on the first information display interface, display preset first prompt information in a preset region around the first information display interface when the first information display interface is slid to a preset first position interval, the first prompt information being used for prompting interface redirecting mode information corresponding to the sliding operation; and display preset second prompt information in the preset region around the first information display interface when the first information display interface is slid to a preset second position interval, the second prompt information being used for prompting a display condition of the function display interface. The second position interval arrives after the first position interval along a preset sliding direction.

Further, on the basis of any embodiment described above, the creation content upload component comprises a creation content selection control, and the apparatus further includes: a display module, configured to display the creation content selection control in a preset display region in the function display interface; and a redirecting module, configured to, in response to a triggering operation of the user on the creation content selection control, redirect to a creation content list, the creation content list comprising at least one type of creation content.

Further, on the basis of any embodiment described above, the apparatus further includes: a determination module, configured to, in response to a selection operation of the user on a creation content in the creation content list, determine a target creation content selected by the user; and a release module, configured to, in response to a release request triggered by the user, release the target creation content.

Further, on the basis of any embodiment described above, the apparatus further includes: a display module, configured to: display, in the creation content capturing component with a preset display effect, a content collected by the creation content acquisition component when the creation content acquisition component is turned off last time, and/or display a preset creation content in the creation content acquisition component with a preset display effect.

Further, on the basis of any embodiment described above, the apparatus further includes: an acquisition module, configured to, in response to a triggering operation of the user on the preset creation content capturing control in the function display interface, perform a creation content acquisition operation to obtain a target creation content; and a release module, configured to, in response to a release request triggered by the user, release the target creation content.

Further, on the basis of any embodiment described above, the apparatus further includes: a redirecting module, configured to, in response to a triggering operation of a user on a preset function icon in any third information display interface, redirect to the function display interface, and display at least part of function components corresponding to the target function in the function display interface, and the third information display interface is an other interface in an application to which the function display interface belongs or an interface outside the application.

Further, on the basis of any embodiment described above, the apparatus further includes: a return module, configured to, in response to a preset triggering operation of the user on the function display interface, return to the third information display interface where the function icon is located.

Further, on the basis of any embodiment described above, the first information display interface comprises a preset display icon. The apparatus further includes: a redirecting module, configured to, in response to a triggering operation of a user on the display icon, redirect to the function display interface, and display at least part of function components corresponding to the target function in the function display interface.

Further, on the basis of any embodiment described above, the first information display interface comprises interaction information of at least one current user and an associated user.

The device provided by the embodiments can be used to implement the technical solution of the above method embodiments, and its implementation principle and technical effects are similar, which are not repeated here in the embodiments.

The embodiments of the present disclosure further provide an electronic device, and the electronic device includes at least one processor and a memory.

The memory stores computer execution instructions.

The at least one processor executes the computer execution instructions stored in the memory, so that the at least one processor is caused to execute the method according to any embodiment described above.

Figure 10:
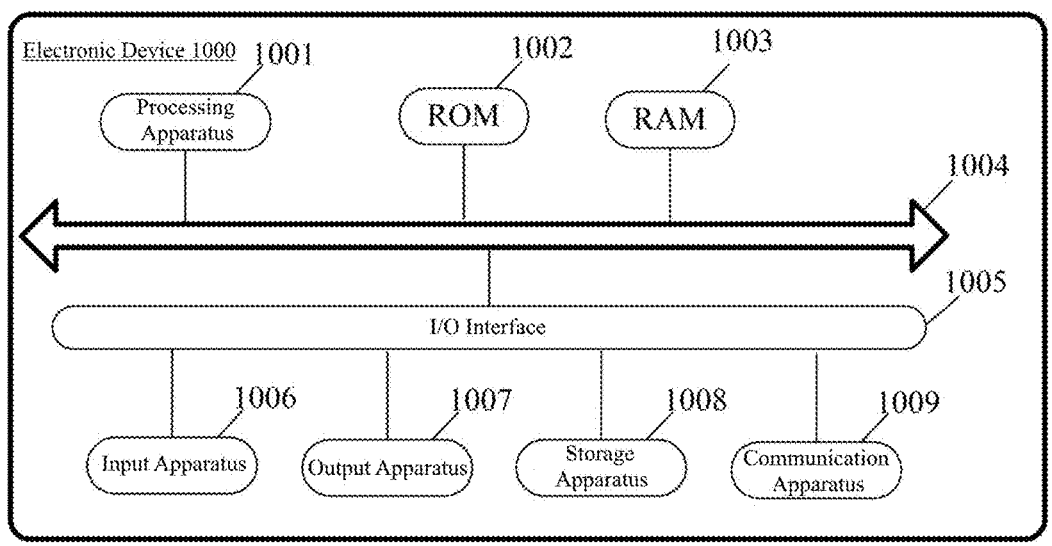
FIG. 10 is a schematic structural diagram of an electronic device provided by an embodiment of the present disclosure.

FIG. 10 is a schematic structural diagram of an electronic device provided by an embodiment of the present disclosure. As shown in FIG. 10, the electronic device 1000 may be a terminal device or a server. The terminal device may include, but not limited to, mobile terminals, such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), etc., and fixed terminals, such as a digital television (TV), a desktop computer, etc. The electronic device shown in FIG. 10 is merely an example and should not impose any limitations on the functions and scope of use of the embodiments of the present disclosure.

As illustrated in FIG. 10, the electronic device 1000 may include a processing apparatus 1001 (e.g., a central processing unit, a graphics processing unit, etc.), which may execute various appropriate actions and processing according to a program stored on a read-only memory (ROM) 1002 or a program loaded from a storage apparatus 1008 into a random access memory (RAM) 1003. The RAM 1003 further stores various programs and data required for operation of the electronic device 1000. The processing apparatus 1001, the ROM 1002, and the RAM 1003 are connected with each other through a bus 1004. An input/output (I/O) interface 1005 is also connected to the bus 1004.

Usually, apparatuses below may be connected to the I/O interface 1005: an input apparatus 1006 including, for example, a touch screen, a touch pad, a keyboard, a mouse, a camera, a microphone, an accelerometer, a gyroscope, or the like; an output apparatus 1007 including, for example, a liquid crystal display (LCD), a speaker, a vibrator, or the like; a storage apparatus 1008 including, for example, a magnetic tape, a hard disk, or the like; and a communication apparatus 1009. The communication apparatus 1009 may allow the electronic device 1000 to perform wireless or wired communication with other devices so as to exchange data. Although FIG. 10 shows the electronic device 1000 having various apparatuses, it should be understood that it is not required to implement or have all the apparatuses illustrated, and the electronic device may alternatively implement or have more or fewer apparatuses.

The embodiments of the present disclosure further provide a computer-readable storage medium, the computer-readable storage medium stores computer execution instructions, and when a processor executes the computer execution instructions, the method according to any embodiment described above is implemented.

The embodiments of the present disclosure further provide a computer program product, the computer program product includes computer execution instructions, and when a processor executes the computer execution instructions, the method according to any embodiment described above is implemented.

Specifically, according to the embodiments of the present disclosure, the process described above with reference to the flowchart may be implemented as computer software programs. For example, the embodiments of the present disclosure include a computer program product, including a computer program carried on a computer-readable medium, and the computer program includes program codes for executing the method shown in the flowchart. In such embodiments, the computer program may be downloaded and installed from the network via the communication apparatus 1009, or installed from the storage apparatus 1008, or installed from the ROM 1002. When executed by the processing apparatus 1001, the computer program may implement the above functions defined in the method provided by the embodiments of the present disclosure.

It should be noted that the computer-readable medium described in the present disclosure may be a computer-readable signal medium or a computer-readable storage medium, or any combination thereof. The computer-readable storage medium may be, but not limited to, an electric, magnetic, optical, electromagnetic, infrared, or semiconductor system, apparatus or device, or any combination thereof. For example, the computer-readable storage medium may include, but not limited to, an electrical connection with one or more wires, a portable computer disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to, an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program codes contained on the computer-readable medium may be transmitted by using any suitable medium, including but not limited to, an electric wire, a fiber-optic cable, radio frequency (RF) and the like, or any appropriate combination of them.

The above-described computer-readable medium may be included in the above-described electronic device, or may also exist alone without being assembled into the electronic device.

The above-mentioned computer-readable medium carries one or more programs, and the one or more programs, when executed by the electronic device, cause the electronic device to implement the method as illustrated in the above embodiments.

The computer program codes for performing the operations of the present disclosure may be written in one or more programming languages or a combination thereof. The above-described programming languages include but are not limited to object-oriented programming languages, such as Java, Smalltalk, C++, and also include conventional procedural programming languages, such as the "C" programming language or similar programming languages. The program codes may by executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flow chart and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The units involved in the embodiments of the present disclosure may be implemented in software or hardware. Here the name of the unit does not constitute a limitation of the unit itself under certain circumstances. For example, the first acquisition unit may also be described as a "unit acquiring at least two Internet protocol addresses."

The functions described herein above may be performed, at least partially, by one or more hardware logic components. For example, without limitation, available exemplary types of hardware logic components include: a field programmable gate array (FPGA), an application specific integrated circuit (ASIC), application specific standard parts (ASSP), a system on chip (SOC), a complex programmable logical device (CPLD), etc.

In the context of the present disclosure, the machine-readable medium may be a tangible medium containing or storing a program that can be used by or in combination with an instruction execution system, apparatus or device. The machine-readable medium may be a machine-readable signal medium or a machine-readable storage medium. The machine-readable medium may include, but not limited to, an electric, magnetic, optical, electromagnetic, infrared, or semiconductor system, apparatus or device, or any appropriate combination thereof. Examples of the machine-readable storage medium may include: an electrical connection based on one or more wires, a portable computer disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them.

In a first aspect, according to one or more embodiments of the present disclosure, an interface display method is provided, and the method includes:

displaying a preset first information display interface, and in response to a first preset triggering operation on the first information display interface, redirecting to a preset function display interface corresponding to a target function, and displaying at least part of function components corresponding to the target function in the function display interface, wherein the first preset triggering operation is a triggering operation with a trigger track, and a length of the trigger track is greater than a preset length threshold.

According to one or more embodiments of the present disclosure, after, in response to the first preset triggering operation on the first information display interface, redirecting to the preset function display interface corresponding to the target function, the method further comprises:

in response to the first preset triggering operation triggered by a user in the function display interface, returning to the first information display interface, and/or in response to a second preset triggering operation triggered by the user in the function display interface, redirecting to a second information display interface.

According to one or more embodiments of the present disclosure, the second preset triggering operation and the first preset triggering operation are opposite gesture operations.

According to one or more embodiments of the present disclosure, the method further includes:

in response to the first preset triggering operation triggered by the user in the second information display interface, redirecting to the function display interface, and/or in response to a third preset triggering operation triggered by the user in the second information display interface, redirecting to the first information display interface.

According to one or more embodiments of the present disclosure, the second information display interface is a content display interface associated with the target function.

According to one or more embodiments of the present disclosure, the target function is a creation content acquisition function and/or a creation content release function.

According to one or more embodiments of the present disclosure, in response to the first preset triggering operation on the first information display interface, redirecting to the preset function display interface corresponding to the target function, and displaying at least part of function components corresponding to the target function in the function display interface comprises:

in response to a preset sliding operation on the first information display interface, redirecting to the function display interface corresponding to the target function, and displaying a creation content acquisition component corresponding to the target function in the function display interface, wherein the creation content acquisition component comprises a creation content capturing component and/or a creation content upload component.

According to one or more embodiments of the present disclosure, in response to the preset sliding operation on the first information display interface, redirecting to the function display interface corresponding to the target function comprises:

in response to the preset sliding operation on the first information display interface, displaying preset first prompt information in a preset region around the first information display interface when the first information display interface is slid to a preset first position interval, the first prompt information being used for prompting interface redirecting mode information corresponding to the sliding operation; and displaying preset second prompt information in the preset region around the first information display interface when the first information display interface is slid to a preset second position interval, the second prompt information being used for prompting a display condition of the function display interface, wherein the second position interval arrives after the first position interval along a preset sliding direction.

According to one or more embodiments of the present disclosure, the creation content upload component comprises a creation content selection control, and after, in response to the preset sliding operation on the first information display interface, redirecting to the function display interface corresponding to the target function, the method further comprises:

displaying the creation content selection control in a preset display region in the function display interface, and in response to a triggering operation of the user on the creation content selection control, redirecting to a creation content list, the creation content list comprising at least one type of creation content.

According to one or more embodiments of the present disclosure, after, in response to the triggering operation of the user on the creation content selection control, redirecting to the creation content list, the method further comprises:

in response to a selection operation of the user on a creation content in the creation content list, determining a target creation content selected by the user, and in response to a release request triggered by the user, releasing the target creation content.

According to one or more embodiments of the present disclosure, after displaying the creation content acquisition component corresponding to the target function in the function display interface, the method further comprises:

displaying, in the creation content capturing component with a preset display effect, a content collected by the creation content acquisition component when the creation content acquisition component is turned off last time, and/or displaying a preset creation content in the creation content acquisition component with a preset display effect.

According to one or more embodiments of the present disclosure, the creation content capturing component comprises a preset creation content capturing control, and after displaying the creation content acquisition component corresponding to the target function in the function display interface, the method further comprises:

in response to a triggering operation of the user on the preset creation content capturing control in the function display interface, performing a creation content acquisition operation to obtain a target creation content, and in response to a release request triggered by the user, releasing the target creation content.

According to one or more embodiments of the present disclosure, the method further includes:

in response to a triggering operation of a user on a preset function icon in any third information display interface, redirecting to the function display interface, and displaying at least part of function components corresponding to the target function in the function display interface, wherein the third information display interface is an other interface in an application to which the function display interface belongs or an interface outside the application.

According to one or more embodiments of the present disclosure, after displaying at least part of function components corresponding to the target function in the function display interface, the method further comprises:
in response to a preset triggering operation of the user on the function display interface, returning to the third information display interface where the function icon is located.

According to one or more embodiments of the present disclosure, the first information display interface comprises a preset display icon, and after displaying the preset first information display interface, the method further comprises:
in response to a triggering operation of a user on the display icon, redirecting to the function display interface, and displaying at least part of function components corresponding to the target function in the function display interface.

According to one or more embodiments of the present disclosure, the first information display interface comprises interaction information of at least one current user and an associated user.

In a second aspect, according to one or more embodiments of the present disclosure, an interface display apparatus is provided, and the apparatus includes:
a display module, configured to display a preset first information display interface; and
a processing module, configured to, in response to a first preset triggering operation on the first information display interface, redirect to a preset function display interface corresponding to a target function, and display at least part of function components corresponding to the target function in the function display interface,
wherein the first preset triggering operation is a triggering operation with a trigger track, and a length of the trigger track is greater than a preset length threshold.

According to one or more embodiments of the present disclosure, the apparatus further includes:
a return module, configured to, in response to the first preset triggering operation triggered by a user in the function display interface, return to the first information display interface; and/or
a redirecting module, configured to, in response to a second preset triggering operation triggered by the user in the function display interface, redirect to a second information display interface.

According to one or more embodiments of the present disclosure, the second preset triggering operation and the first preset triggering operation are opposite gesture operations.

According to one or more embodiments of the present disclosure, the apparatus further includes:
a redirecting module, configured to, in response to the first preset triggering operation triggered by the user in the second information display interface, redirect to the function display interface; and/or
a redirecting module, configured to, in response to a third preset triggering operation triggered by the user in the second information display interface, redirect to the first information display interface.

According to one or more embodiments of the present disclosure, the second information display interface is a content display interface associated with the target function.

According to one or more embodiments of the present disclosure, the target function is a creation content acquisition function and/or a creation content release function.

According to one or more embodiments of the present disclosure, the processing module is configured to:
in response to a preset sliding operation on the first information display interface, redirect to the function display interface corresponding to the target function; and
display a creation content acquisition component corresponding to the target function in the function display interface, the creation content acquisition component including a creation content capturing component and/or a creation content upload component.

According to one or more embodiments of the present disclosure, the processing module is configured to:
in response to the preset sliding operation on the first information display interface, display preset first prompt information in a preset region around the first information display interface when the first information display interface is slid to a preset first position interval, the first prompt information being used for prompting interface redirecting mode information corresponding to the sliding operation; and
display preset second prompt information in the preset region around the first information display interface when the first information display interface is slid to a preset second position interval, the second prompt information being used for prompting a display condition of the function display interface,
wherein the second position interval arrives after the first position interval along a preset sliding direction.

According to one or more embodiments of the present disclosure, the creation content upload component comprises a creation content selection control, and the apparatus further includes:
a display module, configured to display the creation content selection control in a preset display region in the function display interface; and
a redirecting module, configured to, in response to a triggering operation of the user on the creation content selection control, redirect to a creation content list, the creation content list comprising at least one type of creation content.

According to one or more embodiments of the present disclosure, the apparatus further includes:
a determination module, configured to, in response to a selection operation of the user on a creation content in the creation content list, determine a target creation content selected by the user; and
a release module, configured to, in response to a release request triggered by the user, release the target creation content.

According to one or more embodiments of the present disclosure, the apparatus further includes:
a display module, configured to: display, in the creation content capturing component with a preset display effect, a content collected by the creation content acquisition component when the creation content acquisition component is turned off last time, and/or display a preset creation content in the creation content acquisition component with a preset display effect.

According to one or more embodiments of the present disclosure, the apparatus further includes:
an acquisition module, configured to, in response to a triggering operation of the user on the preset creation content capturing control in the function display interface, perform a creation content acquisition operation to obtain a target creation content; and a release module, configured to, in response to a release request triggered by the user, release the target creation content.

According to one or more embodiments of the present disclosure, the apparatus further includes:

a redirecting module, configured to, in response to a triggering operation of a user on a preset function icon in any third information display interface, redirect to the function display interface, and display at least part of function components corresponding to the target function in the function display interface, and the third information display interface is an other interface in an application to which the function display interface belongs or an interface outside the application.

According to one or more embodiments of the present disclosure, the apparatus further includes:

a return module, configured to, in response to a preset triggering operation of the user on the function display interface, return to the third information display interface where the function icon is located.

According to one or more embodiments of the present disclosure, the first information display interface comprises a preset display icon, and the apparatus further includes:

a redirecting module, configured to, in response to a triggering operation of a user on the display icon, redirect to the function display interface, and display at least part of function components corresponding to the target function in the function display interface.

According to one or more embodiments of the present disclosure, the first information display interface comprises interaction information of at least one current user and an associated user.

In a third aspect, according to one or more embodiments of the present disclosure, an electronic device is provided, and the electronic device includes: at least one processor and a memory;

the memory stores computer execution instructions; and
the at least one processor executes the computer execution instructions stored in the memory, so that the at least one processor is caused to execute the interface display method according to the first aspect and various possible designs of the first aspect described above.

In a fourth aspect, according to one or more embodiments of the present disclosure, a computer-readable storage medium is provided, the computer-readable storage medium stores computer execution instructions, and when a processor executes the computer execution instructions, the interface display method according to the first aspect and various possible designs of the first aspect described above is implemented.

In a fifth aspect, according to one or more embodiments of the present disclosure, a computer program product is provided, the computer program product includes computer execution instructions, and when a processor executes the computer execution instructions, the interface display method according to the first aspect and various possible designs of the first aspect described above is implemented.

In a sixth aspect, according to one or more embodiments of the present disclosure, a computer program is provided, the computer program includes computer execution instructions, and when a processor executes the computer execution instructions, the interface display method according to the first aspect and various possible designs of the first aspect described above is implemented.

The foregoing are merely descriptions of the preferred embodiments of the present disclosure and the explanations of the technical principles involved. It should be understood by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the scope of the present disclosure. Some features described in the context of a separate embodiment may also be combined in a single embodiment. Rather, various features described in the context of a single embodiment may also be implemented separately or in any appropriate subcombination in a plurality of embodiments.

Although the present subject matter has been described in a language specific to structural features and/or logical method actions, it should be understood that the subject matter defined in the appended claims is not necessarily limited to the particular features and actions described above. Rather, the particular features and actions described above are merely exemplary forms for implementing the claims.

The invention claimed is:

1. An interface display method, comprising:
displaying a preset first information display interface;
in response to a first preset triggering operation performed in a first direction on the first information display interface, redirecting to and displaying a function display interface corresponding to a target function configured to generate creation content, and displaying at least one function component corresponding to the target function in the function display interface, wherein the first preset triggering operation is a triggering operation with a trigger track, a length of the trigger track is greater than a preset length threshold, and wherein redirecting to the function display interface corresponding to the target function in response to the first preset triggering operation performed on the first information display interface comprises:
in response to a preset sliding operation on the first information display interface, determining whether the first information display interface is slid to a preset first position or a preset second position, wherein the preset first position is different from the preset second position,
displaying first prompt information in response to determining that the first information display interface is slid to the preset first position, and
displaying second prompt information in response to determining that the first information display interface is slid to the preset second position, wherein the first prompt information is different from the second prompt information; and in response to a second preset triggering operation performed in a second direction on the function display interface, redirecting to and displaying a second information display interface configured to display the creation content, wherein the second direction of the second preset triggering operation is opposite to the first direction of the first preset triggering operation.

2. The method according to claim 1, further comprising:
in response to the first preset triggering operation in the function display interface, returning to the first information display interface.

3. The method according to claim 1, further comprising at least one of:
in response to the first preset triggering operation in the second information display interface, redirecting to the function display interface, and
in response to a third preset triggering operation in the second information display interface, redirecting to the first information display interface.

4. The method according to claim 1, wherein displaying the at least one function component corresponding to the target function in the function display interface comprises:
displaying a creation content acquisition component corresponding to the target function in the function display interface, wherein the creation content acquisition component comprises at least one of a creation content capturing component or a creation content upload component.

5. The method according to claim 4, wherein the first prompt information is configured to prompt interface redirecting mode information corresponding to the preset sliding operation, the second prompt information is configured to prompt a display condition of the function display interface, and wherein the preset second position arrives after the preset first position along a preset sliding direction.

6. The method according to claim 4, wherein the creation content upload component comprises a creation content selection control, and after, in response to the preset sliding operation on the first information display interface, redirecting to the function display interface corresponding to the target function, the method further comprises:
displaying the creation content selection control in a preset display region in the function display interface, and
in response to a triggering operation of the user on the creation content selection control, redirecting to a creation content list, the creation content list comprising at least one type of creation content.

7. The method according to claim 6, wherein after, in response to the triggering operation of the user on the creation content selection control, redirecting to the creation content list, the method further comprises:
in response to a selection operation of the user on a creation content in the creation content list, determining a target creation content selected by the user, and
in response to a release request, releasing the target creation content.

8. The method according to claim 4, wherein after displaying the creation content acquisition component corresponding to the target function in the function display interface, the method further comprises at least one of:
displaying, in the creation content capturing component with a preset display effect, a content collected by the creation content acquisition component when the creation content acquisition component is turned off last time, and displaying a preset creation content in the creation content acquisition component with a preset display effect.

9. The method according to claim 4, wherein the creation content capturing component comprises a preset creation content capturing control, and after displaying the creation content acquisition component corresponding to the target function in the function display interface, the method further comprises:
in response to a triggering operation of the user on the preset creation content capturing control in the function display interface, performing a creation content acquisition operation to obtain a target creation content, and
in response to a release request, releasing the target creation content.

10. The method according to claim 1, further comprising:
in response to a triggering operation of a user on a preset function icon in any third information display interface, redirecting to the function display interface, and displaying at least one function component corresponding to the target function in the function display interface, wherein the third information display interface is an other interface in an application to which the function display interface belongs or an interface outside the application.

11. The method according to claim 10, wherein after displaying at least one function component corresponding to the target function in the function display interface, the method further comprises:
in response to a preset triggering operation of the user on the function display interface, returning to the third information display interface where the function icon is located.

12. The method according to claim 1, wherein the first information display interface comprises a preset display icon, and after displaying the preset first information display interface, the method further comprises:
in response to a triggering operation of a user on the display icon, redirecting to the function display interface, and displaying at least one function component corresponding to the target function in the function display interface.

13. The method according to claim 1, wherein the first information display interface comprises interaction information of at least one current user and an associated user.

14. An electronic device, comprising: at least one processor and a memory, wherein the memory stores computer execution instructions, and the computer execution instructions, when executed by the at least one processor, cause the at least one processor to perform operations comprising:
displaying a preset first information display interface;
in response to a first preset triggering operation performed in a first direction on the first information display interface, redirecting to and displaying a preset function display interface corresponding to a target function configured to generate creation content, and displaying at least one function component corresponding to the target function in the function display interface, wherein the first preset triggering operation is a triggering operation with a trigger track, and a length of the trigger track is greater than a preset length threshold, and wherein redirecting to the function display interface corresponding to the target function in response to the first preset triggering operation performed on the first information display interface comprises:
in response to a preset sliding operation on the first information display interface, determining whether the first information display interface is slid to a preset first position or a preset second position, wherein the preset first position is different from the preset second position, displaying first prompt information in response to determining that the first information display interface is slid to the preset first position, and displaying second prompt information in response to determining that the first information display interface is slid to the preset second position, wherein the first prompt information is different from the second prompt information; and in response to a second preset triggering operation performed in a second direction on the function display interface, redirecting to and displaying a second information display interface configured to display the creation content, wherein the second direction of the second preset triggering operation is opposite to the first direction of the first preset triggering operation.

15. A non-transitory computer-readable storage medium, storing computer execution instructions, wherein the computer execution instructions, when executed by a processor, cause the processor to perform operations comprising:

displaying a preset first information display interface;

in response to a first preset triggering operation performed in a first direction on the first information display interface, redirecting to and displaying a preset function display interface corresponding to a target function configured to generate creation content, and displaying at least one function component corresponding to the target function in the function display interface, wherein the first preset triggering operation is a triggering operation with a trigger track, and a length of the trigger track is greater than a preset length threshold, and wherein redirecting to the function display interface corresponding to the target function in response to the first preset triggering operation performed on the first information display interface comprises:

in response to a preset sliding operation on the first information display interface, determining whether the first information display interface is slid to a preset first position or a preset second position, wherein the preset first position is different from the preset second position, displaying first prompt information in response to determining that the first information display interface is slid to the preset first position, and displaying second prompt information in response to determining that the first information display interface is slid to the preset second position, wherein the first prompt information is different from the second prompt information; and in response to a second preset triggering operation performed in a second direction on the function display interface, redirecting to and displaying a second information display interface configured to display the creation content, wherein the second direction of the second preset triggering operation is opposite to the first direction of the first preset triggering operation.

16. The electronic device according to claim 14, the operations further comprising:

in response to the first preset triggering operation in the function display interface, returning to the first information display interface.

17. The electronic device according to claim 14, the operations further comprising at least one of:

in response to the first preset triggering operation in the second information display interface, redirecting to the function display interface; or in response to a third preset triggering operation in the second information display interface, redirecting to the first information display interface.

18. The electronic device according to claim 14, wherein the creation content upload component comprises a creation content selection control, and after, in response to the preset sliding operation on the first information display interface, redirecting to the function display interface corresponding to the target function, the operations further comprise:

displaying the creation content selection control in a preset display region in the function display interface; and in response to a triggering operation of the user on the creation content selection control, redirecting to a creation content list, the creation content list comprising at least one type of creation content.

19. The electronic device according to claim 14, wherein after displaying the creation content acquisition component corresponding to the target function in the function display interface, the operations further comprise at least one of:

displaying, in the creation content capturing component with a preset display effect, a content collected by the creation content acquisition component when the creation content acquisition component is turned off last time; or displaying a preset creation content in the creation content acquisition component with a preset display effect.

20. The electronic device according to claim 14, wherein the creation content capturing component comprises a preset creation content capturing control, and after displaying the creation content acquisition component corresponding to the target function in the function display interface, the operations further comprise:

in response to a triggering operation of the user on the preset creation content capturing control in the function display interface, performing a creation content acquisition operation to obtain a target creation content; and in response to a release request, releasing the target creation content.

\* \* \* \* \*